(12) United States Patent
Wang (10) Patent No.: US 6,799,232 B1
(45) Date of Patent: Sep. 28, 2004

(54) AUTOMATIC BYTE SWAP AND ALIGNMENT FOR DESCRIPTOR-BASED DIRECT MEMORY ACCESS DATA TRANSFERS

(75) Inventor: Yi-Wen Wang, Irvine, CA (US)

(73) Assignee: Zarlink Semiconductor V.N., Inc., Irvine, CA (US)

( * ) Notice: Subject to any disclaimer, the term of this patent is extended or adjusted under 35 U.S.C. 154(b) by 47 days.

(21) Appl. No.: 10/309,479

(22) Filed: Dec. 4, 2002

Related U.S. Application Data (60) Provisional application No. 60/337,798, filed on Dec. 5, 2001.

(51) Int. Cl.[7] .............................. G06F 3/00; G06F 7/00; G06F 13/12; G06F 13/28; G06F 13/42
(52) U.S. Cl. ............................. 710/65; 710/11; 710/16; 710/22; 710/23; 710/24; 710/62; 710/72; 710/105; 710/308; 710/315; 709/230; 712/300; 341/50
(58) Field of Search ................................ 710/11, 16, 65, 710/105, 315, 22–24, 26–28, 62, 72–74, 308; 709/200, 202, 250, 230, 237; 341/50; 712/300

(56) References Cited

U.S. PATENT DOCUMENTS

| | | | | |
|---|---|---|---|---|
| 5,317,715 A | * | 5/1994 | Johnson et al. ................ | 710/22 |
| 5,781,763 A | * | 7/1998 | Beukema et al. .............. | 710/22 |
| 5,828,853 A | * | 10/1998 | Regal .......................... | 710/315 |
| 5,862,407 A | | 1/1999 | Sriti | |
| 5,944,800 A | * | 8/1999 | Mattheis et al. ............... | 710/23 |
| 5,961,640 A | * | 10/1999 | Chambers et al. ........... | 712/300 |
| 6,388,586 B1 | * | 5/2002 | Fischer et al. ................ | 341/51 |

* cited by examiner

*Primary Examiner*—Fritz Fleming
*Assistant Examiner*—Tanh Nguyen
(74) *Attorney, Agent, or Firm*—Lawrence E. Laubscher, Jr.

(57) ABSTRACT

A physical interface card for connection to a data bus associated with a data network node is provided. The physical interface card is adapted to perform without supervision from other data bus connected devices: byte ordering, byte alignment and byte scattering/gathering in conveying data between a data bus connected central memory block and at least one data channel associated with the physical interface card. The functionality is provided via a special function direct memory address device operating in accordance with byte ordering specifications for: data stored in the shared memory block and data conveyed via the at least one data channel. The byte alignment is enabled by direct byte addressing techniques as well as the use of an orphan counter to keep track of processed bytes. An implementation of the orphan counter as a state machine reduces processing overheads. Advantages are derived from performing byte ordering, byte alignment, as well as scattering and gathering of data segments without help from other data bus connected entities.

13 Claims, 8 Drawing Sheets

AUTOMATIC BYTE SWAP AND ALIGNMENT FOR DESCRIPTOR-BASED DIRECT MEMORY ACCESS DATA TRANSFERS

FIELD OF THE INVENTION

This application claims the benefit from U.S. provisional patent application 60/337,798, filed Dec. 5$^{th}$, 2001.

FIELD OF THE INVENTION

The invention relates to processing data at data network nodes, and in particular to methods and apparatus for performing Direct Memory Access (DMA) data transfers with improved efficiency.

BACKGROUND OF THE INVENTION

In the field of data processing it is known to use data buses to enable data transfers between data bus connected devices. In the field of data networking, network nodes such as, but not limited to: data switching nodes, bridges, routers, hubs, aggregation devices, deaggregation devices, multiplexers, demultiplexers, etc. are computing platforms which include data bus connected devices such as: memory storage, processors, physical interface peripherals (cards), etc.

Typical network node designs have an architecture in which a single bus master, a Central Processing Unit (CPU), oversees and coordinates the overall operation thereof. For short periods of time, as directed by the CPU, other data bus connected devices may control the data bus through bus mastering techniques.

Recently data network node designs have an architecture in which multiple data bus connected devices, such as processors and physical interface peripherals, cooperate to access a central memory storage to process data, each such data bus connected device operating as a bus master.

Although network nodes can be implemented on a computing platform such as a ubiquitous microcomputer, high data throughput capacity high performance network nodes are implemented as special purpose data processing equipment.

Data is received and transmitted via a multitude of interconnecting links associated with physical interfaces on the network equipment. In processing data at network nodes, data is received, switched and transmitted either severally or in combination in accordance with a multitude of transfer protocols. Each combination of a transfer protocol and a physical interface conveys data having a data format. The data format specifies a data transfer order and an alignment. Furthermore the data bus connected devices such as: interface cards, memory blocks, mass storage devices, switching processors, functional processors, supervisory processors, etc. process and convey data in accordance to a data transfer order and alignment associated therewith. Due to a competitive rapid development of data transport equipment and transport protocols, a data transfer order and alignment mismatch may exist therebetween.

A variety of data ordering conventions are being used and relate to an order in which data bits constitutive of data bytes are received, processed and transmitted. Data bit ordering includes, but is not limited to: a little-endian bit order and a big-endian bit order. With the advent of wide data buses the data ordering also includes byte ordering. A byte is a unit of data comprised of a sequence of bits used to represent numerical values and typographical symbols such as: characters and decimals. Data byte ordering includes, but is not limited to: a little-endian byte order and a big-endian byte order. Bytes are used singly or in combination to specify numerical values representative of the data. Combinations of two bytes are referred to as words, whereas combinations of four bytes are referred to as double words or dwords.

Little-endian ordering refers to the conveyance and/or processing of Least Significant Bits (LSB) of bit streams or bytes, first. With respect to bytes, little-endian ordering refers to the conveyance and/or processing of Least Significant Bytes (LSB) of a word/dword, first. Big-endian ordering refers to the conveyance and/or processing of Most Significant Bits/Bytes (MSB) first.

Bytes may be ordered in a variety of ways, the ordering being a design choice and/or a necessity in efficiently conveying and/or processing data for a particular application such as a network node.

The conveyance of data over data links (including between dissimilar vendor equipment) is also subject to data ordering imposed by transfer protocols used. Therefore, there may exist a clash between a network node implementing a particular byte order used in processing the data, such as little-endian byte ordering, whereas the transfer protocol used specifies a different byte order used in conveying data, such as big-endian byte ordering. The clash can only be eliminated by reordering the bytes at the network node prior to transmission or post reception of data.

The recent explosion of technological advances in the telecommunications field has benefited from a competitive environment in which a relatively large number of vendors have produced and deployed a large number of network node models using a large number of interface types each of which adhering to at least one of a relatively large number of transfer protocols.

Another important factor to be considered in processing data concerns data alignment and in particular byte alignment. The data buses used in conveying data internally between data bus connected devices use parallel data transfers, with 2, 4, 8, 16, etc. bytes being transferred on each cycle of an associated data bus clock according to the data bus width. For example, 4 bytes of data are transferred on each clock cycle for a 32 bit data bus.

Data buses also make use of addressing lines, integral to each data bus, to select memory locations where to write to, and to read from. Although indirect addressing is used to access every byte of data in memory, it is common practice to address a number of bytes at the same time since the bytes are transferred over the data bus in groups. For the above example, typically when using a 32 bit data bus, data bus addressing locations are defined every 4 bytes. This is referred to as dword alignment of data. Indirect addressing of data, to access the individual bytes in each dword for example, is performed subsequent to the transfer of the dword from the memory for processing. A data processing overhead is incurred if only a fewer number of bytes from the transferred dword are used in processing.

Such overheads can be significant in data switching environments where the data to be processed includes Protocol Data Units (PDUs). Each PDU has a PDU header and a payload. The header specifies routing information in accordance with a particular transfer protocol and is updated or rewritten at each network node in a transport path. The header may be discarded altogether as the data conveyed undergoes protocol conversion. The header may be considered part of the payload as the PDU is encapsulated and conveyed using another transfer protocol. All these processes necessitate data re-alignment in the processing thereof.

Prior art data bus connected devices such as interface cards, mass storage devices, etc. rely on switching processors, functional processors, supervisory processors, etc. to provide correct data ordering and alignment. Depending on the byte order of the data processing equipment and the applications used, a processor takes the time-consuming job to re-organize and re-order the data using storage resources and processing cycles to copy the data, re-order the bytes, and re-align the bytes before and/or after processing.

Current network nodes support a variety of low capacity and high capacity interfaces as well as a variety of transfer protocols to provide aggregation/deaggregation functionality in addition to PDU switching therefore a significant amount of processing time is devoted to reordering and re-aligning data.

An attempt at relieving a CPU from performing byte re-ordering is presented in prior art U.S. Pat. No. 5,862,407 entitled "SYSTEM FOR PERFORMING DMA BYTE SWAPPING WITHIN EACH DATA ELEMENT IN ACCORDANCE TO SWAPPING INDICATION BITS WITHIN A DMA COMMAND" which issued on Jan. $19^{th}$, 1999 to Sriti describes a video card for a computer which conveys a data stream using multiplexers. Based on swapping indication bits, the video card uses a different multiplexer tap for read and/or write operations. Although inventive, the swapping indication bits are specified by a high level software application such as a video driver. The video driver comprises data code executed by the CPU. The swapping indication bits are stored along with a data transfer length specification trading off the ability of the data transfer length specifier—the data transfer length specifier being only able to specify the data transfer lengths in terms of double words.

Due to strict data processing requirements in PDU switching environments, software involvement in the byte ordering specification introduces unwanted inefficiencies if used. The methods provided by the prior art further assume a double word alignment of data at all times. However, without the ability of specifying data transfer lengths in bytes, the prior art methods do not provide a suitable solution for byte level data transfers except through processing intensive indirect addressing. Furthermore the data needs to be aligned during data transfers since the assumption of double word aligned data cannot be relied upon.

There therefore is a need to provide methods and apparatus to overcome the above mentioned issues in providing efficient data transfers in processing data.

SUMMARY OF THE INVENTION

In accordance with an aspect of the invention, a network node processing Protocol Data Units (PDUs) is provided. The network node includes: a central memory store for retrievably storing PDU data segments, a byte order specification register specifying a byte order for data stored in the central memory store, and at least one peripheral interface conveying PDU data having a byte order. Each peripheral interface includes: a byte order specification register specifying the byte order of the PDU data conveyed a data channel, and a direct memory access controller. The direct memory access controller is responsive to byte order specifications in conveying data. The direct memory access controller performs byte order conversion on the data during the conveyance thereof reducing processing overheads at the network node.

In accordance with another aspect of the invention, a peripheral interface conveying PDU data via a channel is provided. The peripheral interface has a channel byte order specification register specifying a byte order of the PDU data conveyed via the data channel. The peripheral interface also has a direct memory access controller responsive to a system byte order specification register and the channel byte order register to perform byte order conversion on the PDU data during the conveyance thereof at reduced processing overheads.

In accordance with a further aspect of the invention, a direct memory access descriptor specification is provided. The direct memory access descriptor tracks data segment information and includes: a direct memory access descriptor address specifier, a data structure delimiter specifier, a start memory storage address specifier, a data size specifier, and a byte order specifier. The DMA descriptor address specifier points to a next direct memory address descriptor. The start memory storage address specifier points to a memory segment. And, the data size specifier holds a number of contiguous data bytes stored in the memory segment.

In accordance with yet another aspect of the invention, a state machine specifying values of an orphan counter is provided. The orphan counter is used for gathering, re-ordering and aligning data conveyed.

The advantages are derived from a reduction in processing overheads associated with byte gathering, byte reordering and aligning data.

BRIEF DESCRIPTION OF THE DRAWINGS

The features and advantages of the invention will become more apparent from the following detailed description of the preferred embodiments with reference to the attached diagrams wherein.

It will be noted that in the attached diagrams like features bear similar labels.

DETAILED DESCRIPTION OF THE EMBODIMENTS

Figure 1:
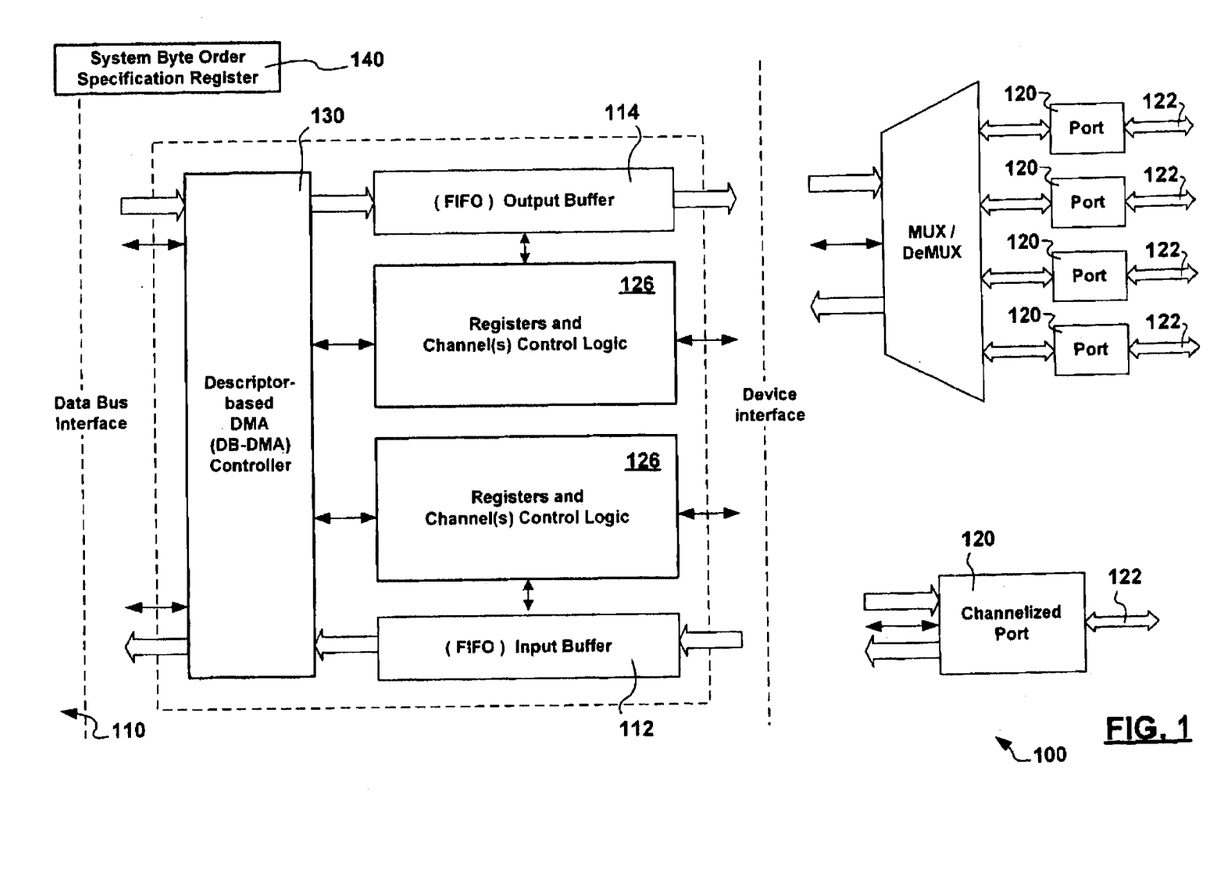
FIG. 1 is a schematic diagram showing an exemplary physical interface connected to a data bus, in accordance with an exemplary implementation of the invention.

FIG. 1 is a schematic diagram showing, in accordance with the preferred implementation of the invention, an exemplary physical interface 100 connected to a data bus 110. The physical interface 100, typically a peripheral interface card, may include at least one data channel 120 associated with physical data links 122. The data format, including data ordering to transfer data used in accordance with corresponding transfer protocols, may be specified for each channel 120. The data format specification includes the use of hardware, firmware, and/or software channel configuration registers 126.

Data structures such as a received PDU may have a size exceeding an available single, free, contiguous memory segment. By spreading the PDU out over a group of available free memory segments a single large contiguous memory segment does not need to be found for the PDU. This technique is known as scattering.

In accordance with an exemplary embodiment of the invention, DMA data transfers are performed in accordance with specifications provided via memory resident data structures called DMA descriptors.

Figure 2:
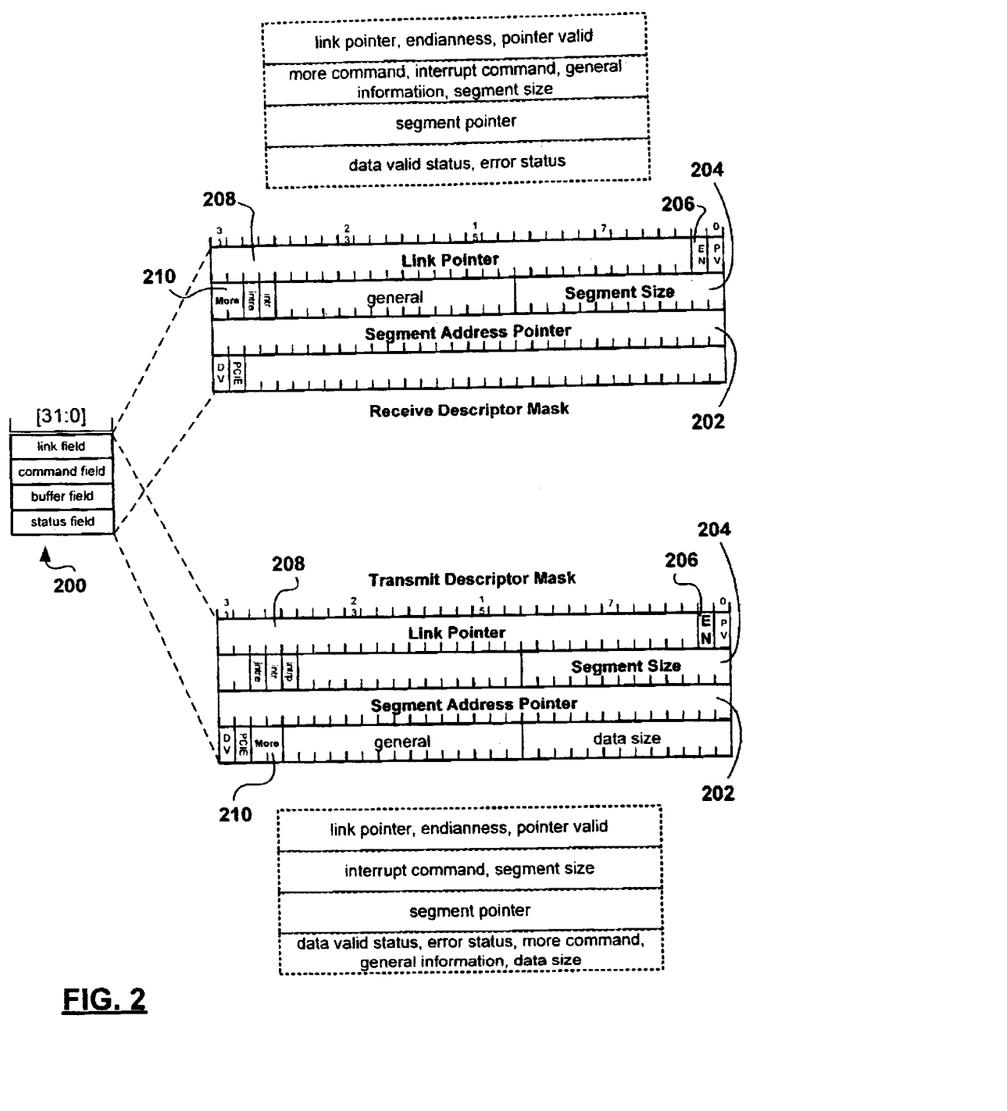
FIG. 2 is a schematic diagram showing a descriptor format specification, showing descriptor fields used in sequencing memory segments holding sequential data, in accordance with a exemplary embodiment of the invention.

FIG. 2 is a schematic diagram showing a descriptor format specification including descriptor fields used in specifying a sequence memory segments holding sequential data.

Each descriptor structure 200 holds information regarding a segment of memory holding data. Also shown in FIG. 2 are descriptor bit masks defining descriptors 200 used in conveying received and transmitted data via the interface 100 respectively.

A segment pointer 202 specifies a byte aligned memory storage address of the corresponding data segment. A data size field 204 specifies the size of the memory segment in bytes. An byte order field 206 specifies the byte order of the data stored in the memory segment (402).

In accordance with the exemplary embodiment of the invention, a DMA controller 130 (see FIG. 1) performs automatic byte order conversion between little and big endian data formats in conveying the PDU between the physical interface 100 and a central memory buffer (410), accessed via a data bus 110, in accordance to byte ordering specifications 126 of the channel 120 conveying the data and the byte ordering specification of the network node. The network node may have a system data format specification held in a system configuration register 140 including a one of: little-endian, big-endian, middle-endian, etc. In conveying PDU data over the channels 120, the interface card 100 makes use of an input buffer 112 and an output buffer 114.

Figure 3:
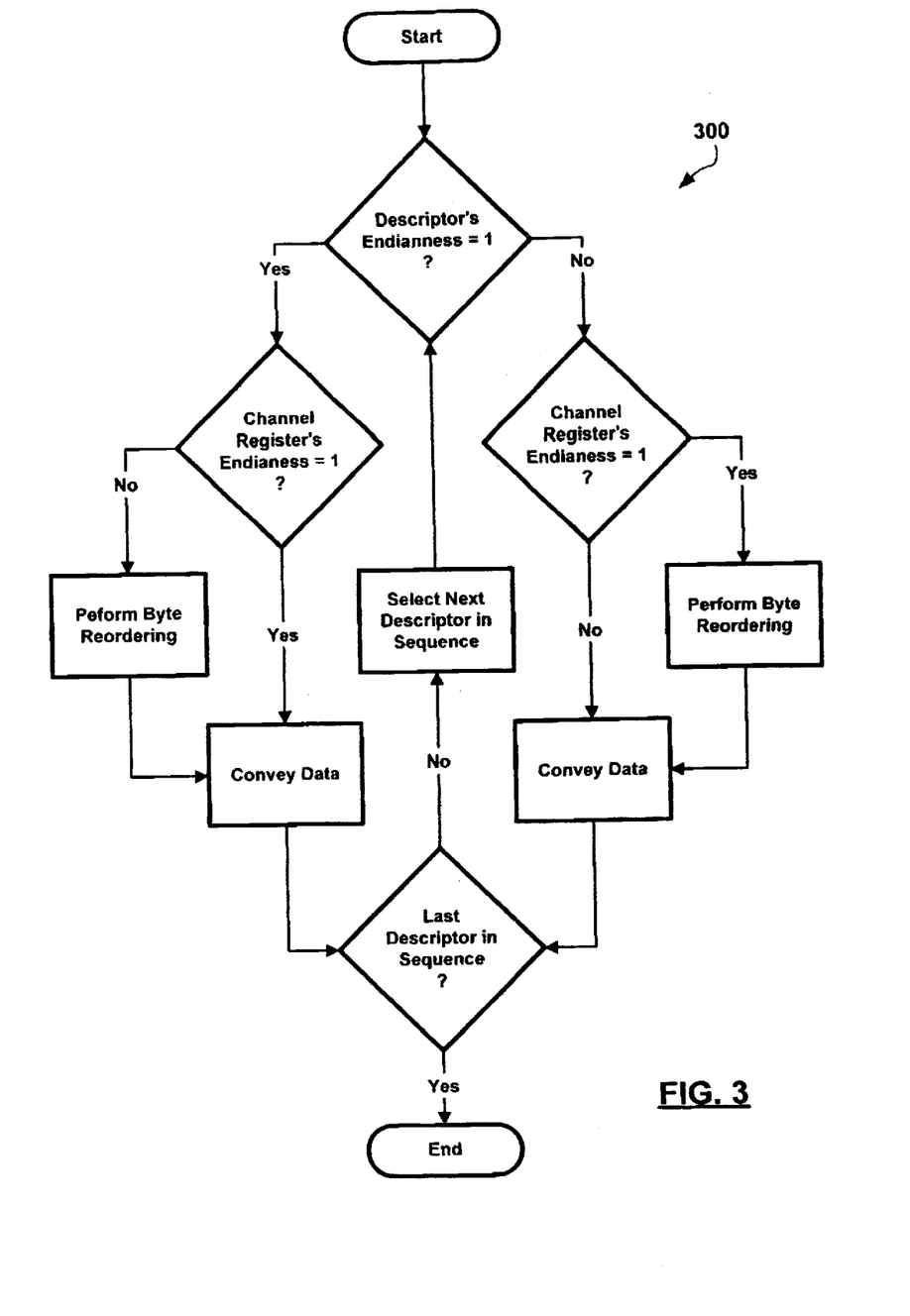
FIG. 3 is a schematic diagram showing steps of a byte reordering determination process in accordance with the exemplary embodiment of the invention.

FIG. 3 is a schematic diagram showing steps of a byte swapping determination process.

For example, little endian byte ordering is specified by a logic high value of the byte ordering field 206 (see FIG. 2) while a logic low value of the byte ordering specifier 206 corresponds to the big endian byte ordering. If the byte order specifications 126/206 and 140/206 match, then no byte reordering is performed. If the endian specifications 126/206 and 140/206 are different, byte swapping is performed based on the two specifications and the direction of the data transfer across the physical interface 100.

Figure 4:
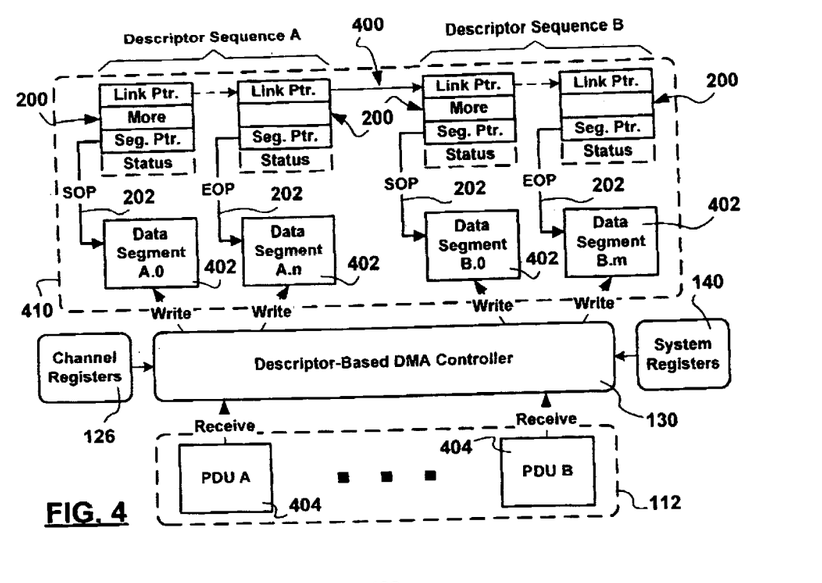
FIG. 4 is a schematic diagram showing the scattering of received PDU data in writing the PDU data in a central memory store, in accordance with the exemplary embodiment of the invention.

FIG. 4 is a schematic diagram showing the scattering of received PDU data in writing PDUs to a central memory store.

In receiving a PDU 404 at a network node, the PDU 404 is stored in an input buffer 112 (see FIG. 1) associated with a receiving physical interface 100, once stored in the input buffer 112, the size of the PDU 404 can be determined. The DMA controller 130 requests memory storage for each PDU 404 from a central memory block 410 of the network node.

A PDU queuing controller implemented either in software, firmware or hardware for the network node, allocates free memory storage. The allocated memory storage includes at least one free memory segment 402.

The sequence of free memory segments 402 used to store the PDU 404 is specified in a linear DMA descriptor list 400 which is parsed by the DMA controller 130 while conveying the PDU data to the central memory block 410. The DMA descriptor list 400 is typically stored in the central memory block 410 along with the constituent PDU data (402).

A linear descriptor list 400 may be used to specify the sequence of memory segments 402 holding each PDU 404. The sequence of descriptors 200 is specified via the use of a link pointer field 208 (see FIG. 2) which specifies the storage address of the next descriptor 200. A "more" data field 210 is used to signify whether the PDU boundary has been reached.

The descriptor list 400 is to be used subsequently by other data bus connected devices such as PDU pre-processors (PDU classifier), switching processor, sequencer, to access the PDU data, and eventually by another/the DMA controller 130 in transmitting the PDU 404 over an output interface 100 of the data network node.

Figure 5:
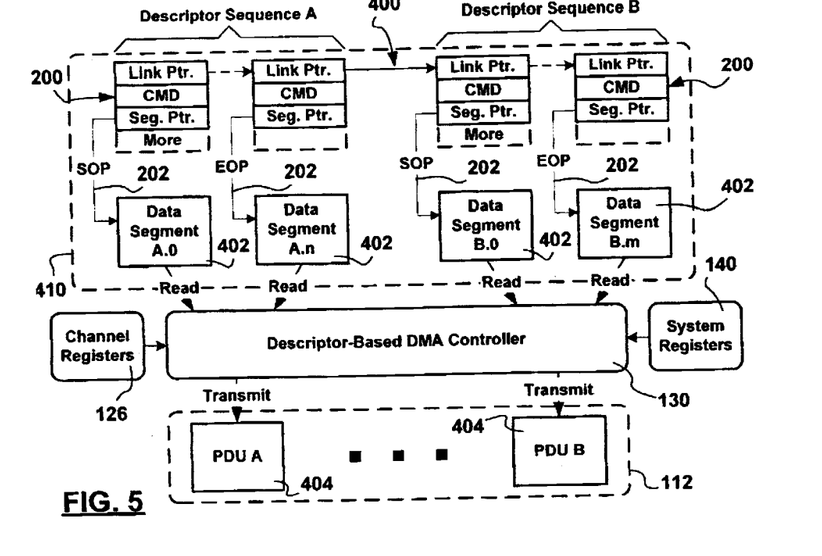
FIG. 5 is a schematic diagram showing the gathering of transmitted PDU data in reading the PDU data from the central memory store, in accordance with the exemplary embodiment of the invention.

FIG. 5 is a schematic diagram showing the reading of PDUs from the central memory store 410.

In accordance with the preferred embodiment of the invention, the DMA controller 130, in transferring PDU data from the central memory storage 410 to the corresponding channel 120 of the physical interface 100, parses a corresponding descriptor list 400 to access (202) the underlying data segments 402. The DMA controller 130 then assembles each PDU 402 to form a header and payload. The PDU assembly process includes the extraction of payload bytes from memory segments 402 stored at locations 202 in the central memory store 410.

Figure 6:
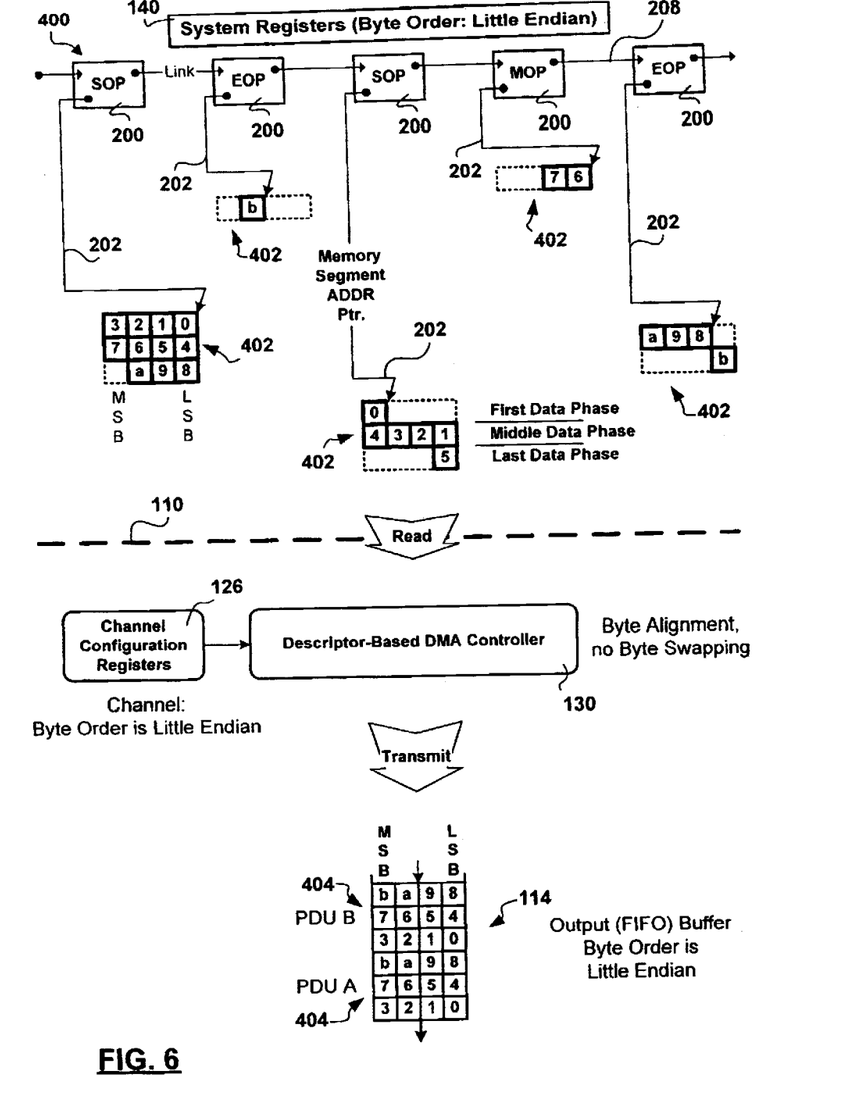
FIG. 6 is a schematic diagram showing automatic gathering and byte alignment in transmitting a PDU in accordance with the exemplary embodiment of the invention.

FIG. 6 is a schematic diagram showing automatic gathering and byte alignment in transmitting a PDU.

In accordance with the preferred embodiment of the invention, the DMA controller 130, gathers descriptor specified memory segments 402 making up the header and payload data on a byte level alignment without intervention from other data bus connected devices. In accordance with the 32 bit data bus example, the storage location 202 in the central memory store 410 may not necessarily be double word aligned. Byte level access is enabled by use of all bits an the address specifier 202, shown in FIG. 2.

Figure 7:
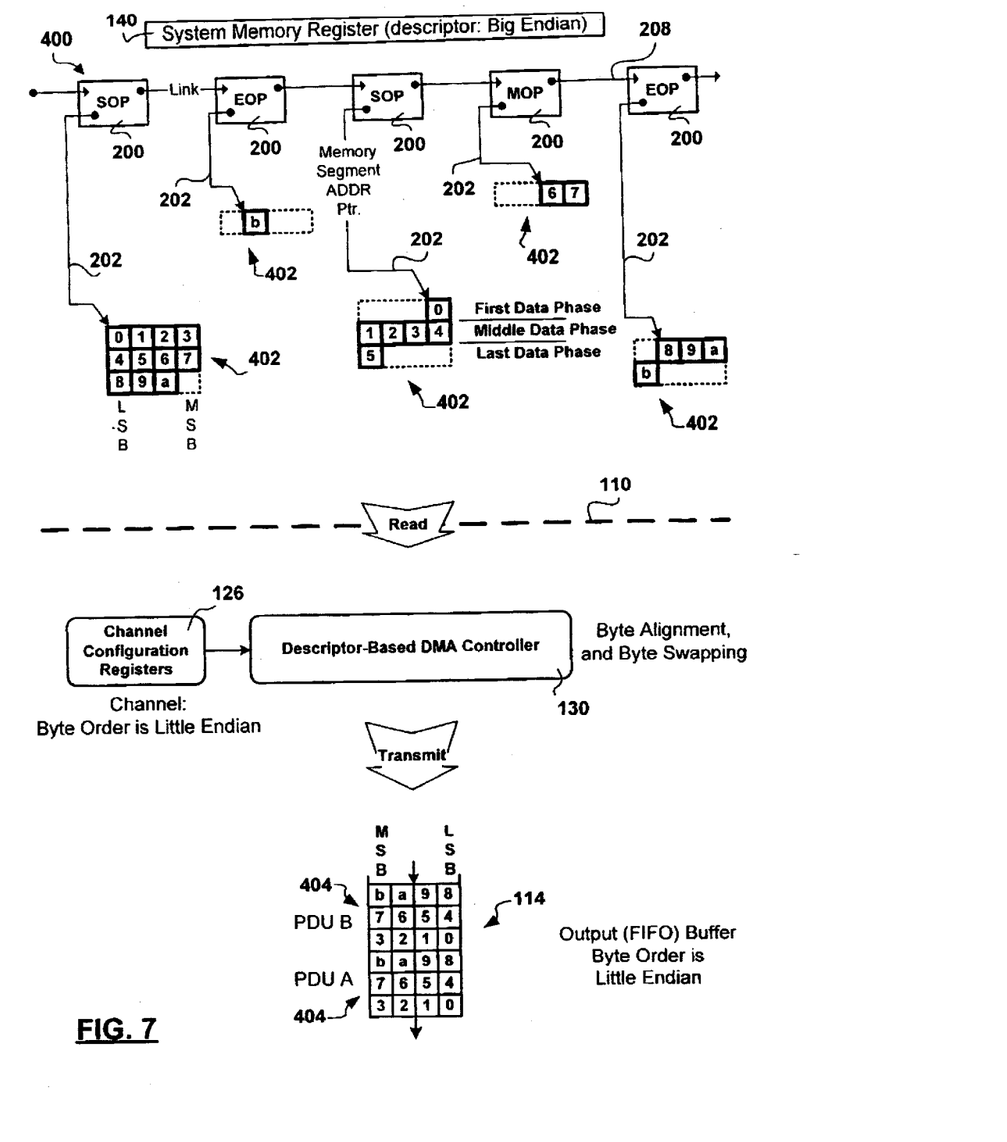
FIG. 7 is a schematic diagram showing automatic gathering, byte alignment as well as byte swapping in accordance with the exemplary embodiment of the invention.

FIG. 7 is a schematic diagram showing automatic gathering, byte alignment, and byte reordering in transmitting a PDU.

The DMA controller 130, gathers data from the central memory store 410 on any byte boundary, aligns the data on double word boundaries, and performs the byte order conversion to form a complete PDU without intervention from other data bus connected devices. The combination of functions provides for efficient PDU processing reducing processing overheads in assembling PDUs 404.

In accordance with an exemplary implementation of the invention, the gathering, alignment and re-ordering functions shown in FIG. 6 and FIG. 7 use a counter to keep track od gathered bytes. For example, for double word data transfers over a data channel 120 on the physical interface 100, the counter may simply be implemented using a two bit register. The counter is started on a double-word boundary of the PDU data stored in the output buffer 114 and if double word aligned data is provided the counter rolls-over every 4 bytes on the double-word boundary. The value of the counter may be used to specify a next location within a double word the next data byte is to be written to. For this reason, the counter is further referred to as an orphan counter.

Having in view that the actual data stored in the central memory store 410 is not double word aligned, and that the byte order may be changed in writing data to the output buffer 114, it is recognized that the orphan counter may not take sequential values.

Figure 8:
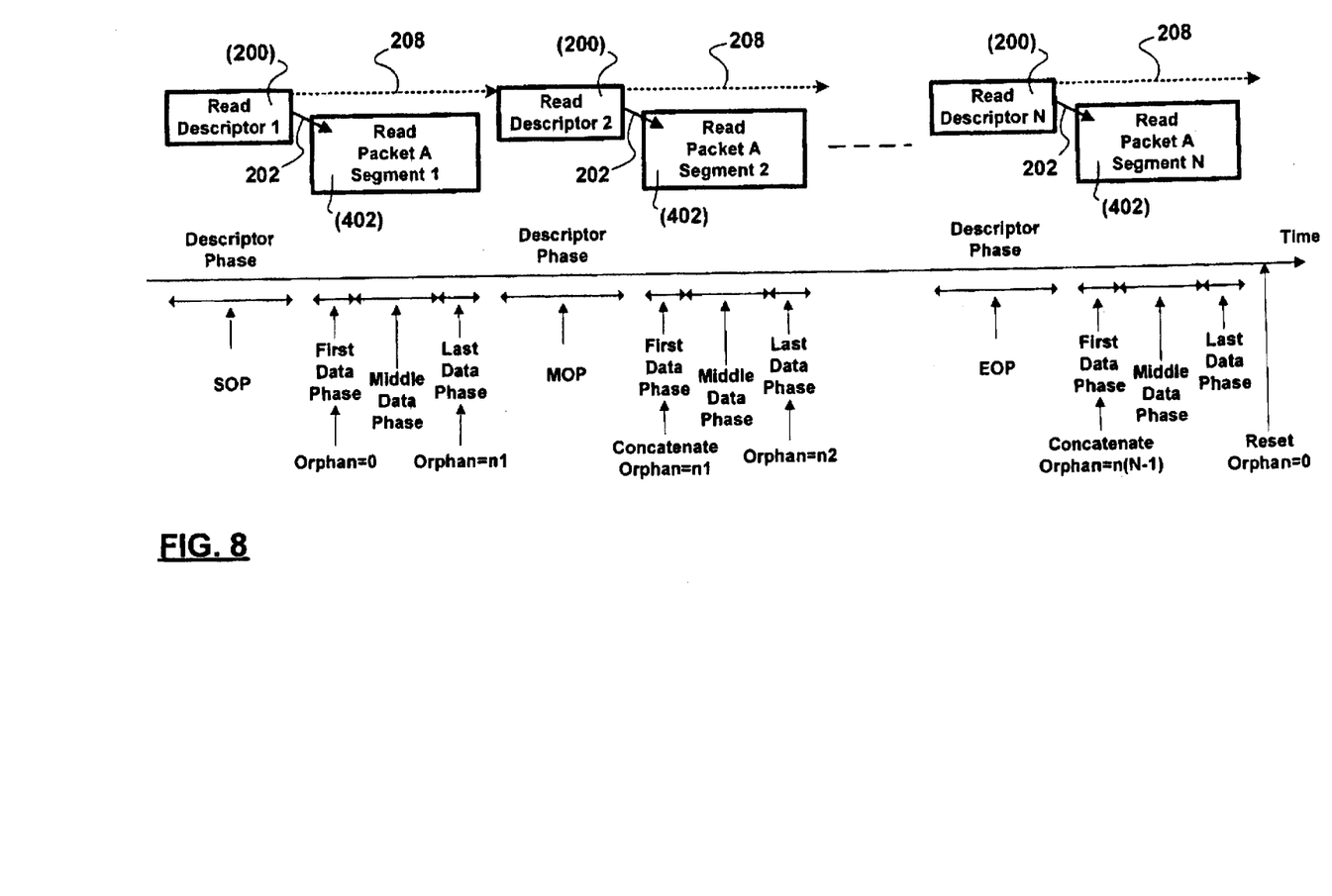
FIG. 8 is a schematic diagram showing exemplary transfer phase details in conveying a PDU in accordance with the exemplary embodiment of the invention.

FIG. 8 shows the details of an exemplary PDU transfer for a 32 bit architecture network node. The data segments stored in memory segments 402 are read as double words from the central memory store 410. The double words of each memory segment 402 are categorized into:

a single potentially, and often, incomplete first double word;

potentially multiple complete middle double words; and a single potentially, and often, incomplete last double word.

Complete middle double words and last double words may not be present for each memory segment. The values taken by the orphan counter therefore are governed differently during a first data phase, a middle data phase, and a last data phase.

Descriptor phases are used by the DMA controller 130 to read DMA descriptors 200 in the descriptor list (400) and these do not have an effect on the values taken by the orphan counter.

Descriptor phases therefore exist between all DMA descriptors 200 however the orphan counter must be reset to zero after aligning and ordering a last PDU data segment known as End-Of-Packet (EOP). The processing of an EOP data segment is signified by the absence of the "more" command 210 in the corresponding DMA descriptor 200. A Start-Of-Packet (SOP) data segment corresponds to a first DMA descriptor 200 in a sequence of DMA descriptors to specify a "more" command 210 after an EOP data segment. Data segments between the SOP and the EOP data segments are Middle-Of-Packet (MOP) segments. The orphan counter value is carried over between:

SOP and MOP;

MOP and EOP; and

SOP and EOP data segment processing.

Figure 9:
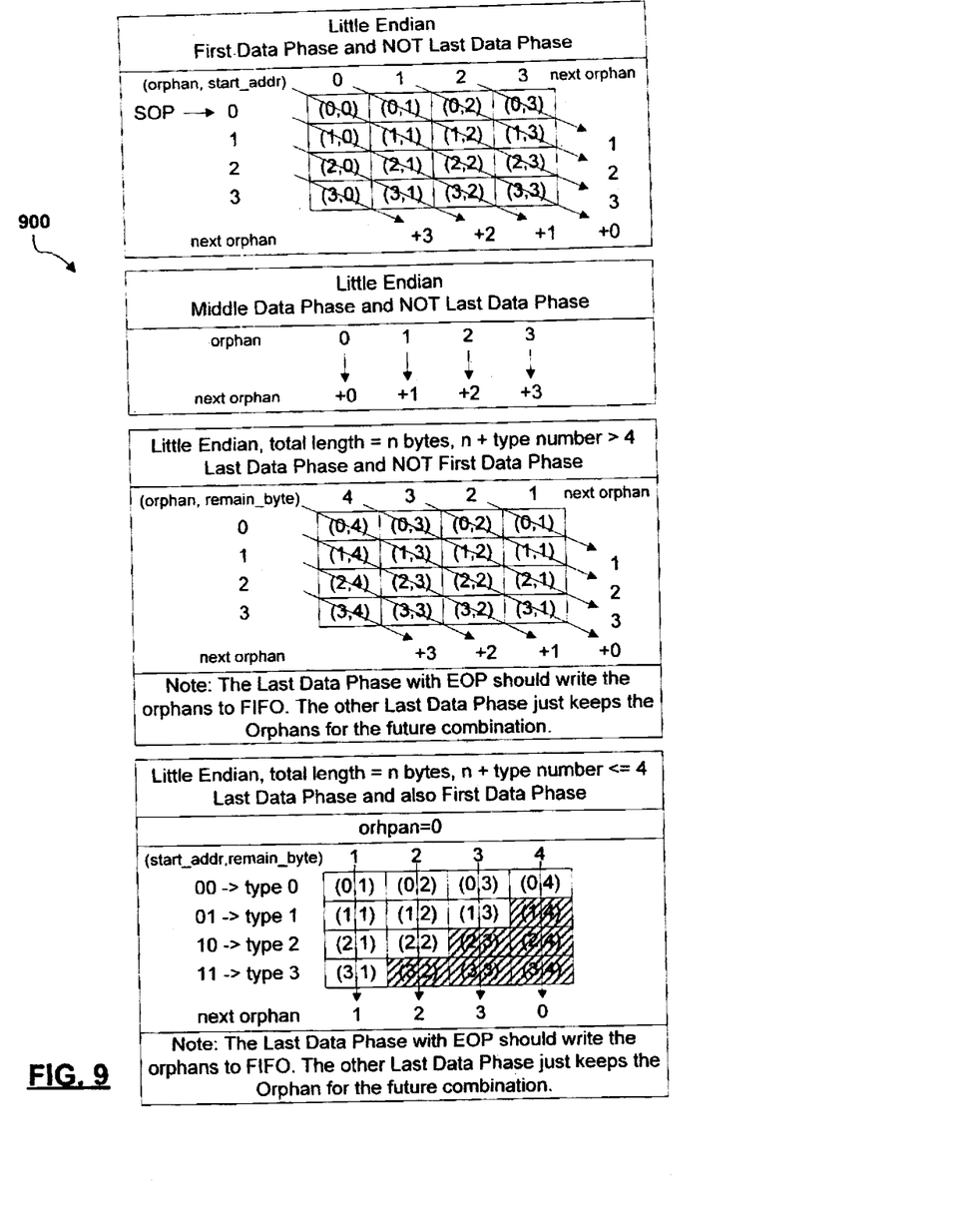
FIG. 9 is a schematic diagram showing further implementation details of an orphan counter state machine in accordance with the exemplary embodiment of the invention.

An exemplary state machine implementation presented in FIG. 9 provides orphan counter values to enable data alignment and little endian ordering in gathering data segments with minimal overhead.

As a concrete example, traditional Ethernet packets have a 1518 byte maximum size. The Gigabit Ethernet standard defines Jumbo Packets having sizes of up to 64 kB. The descriptor based DMA controller 130 presented herein, supports 64 kB packets via the scatter/gather function.

In accordance with another implementation of the invention, DMA descriptors 200 are arranged in DMA descriptor rings (not shown). DMA descriptor rings may be used to store PDU data in circular buffers.

The embodiments presented are exemplary only and persons skilled in the art would appreciate that variations to the above described embodiments may be made without departing from the spirit of the invention. The scope of the invention is solely defined by the appended claims.

I claim:

1. A network node processing Protocol Data Units (PDU) comprising:
   a. a central memory store for retrievably storing at least one PDU data segment;
   b. a system byte order specification register specifying a byte order for data stored in the central memory store;
   c. at least one peripheral interface conveying PDU data, each peripheral interface including:
      i. a channel byte order specification register specifying a byte order of the PDU data conveyed via a data channel; and
      ii. a direct memory access controller responsive to the system byte order specification register and the channel byte order specification register in conveying PDU data; and
   d. an orphan counter for tracking data bytes conveyed between the central memory store and the at least one peripheral interface, said orphan counter being implemented via a register having a largest expressible value chosen to roll-over on a selected data alignment boundary of a data stream conveyed via the peripheral interface,
   the direct memory access controller performing byte order conversion on the PDU data during the conveyance thereof to reduce processing overheads at the network node.

2. A network node as claimed in claim 1, further comprising at least one data bus for conveying data between the physical interface and the central memory store.

3. A network node as claimed in claim 1, further comprising a plurality of descriptors being used to track information regarding a corresponding plurality of memory segments, each memory segment storing a corresponding PDU data segment in the central memory store.

4. A network node as claimed in claim 3, wherein the plurality of descriptors includes memory resident descriptors.

5. A network node as claimed in claim 3, wherein the plurality of descriptors define one of a descriptor list and a descriptor ring.

6. A network node as claimed in claim 5, wherein when defining one of the descriptor list and the descriptor ring, each descriptor further comprises a link specifier holding a start memory storage specification of another descriptor.

7. A network node as claimed in claim 3, wherein the at least one descriptor further includes:
   a. a data address specifier holding a start address of a memory storage segment; and
   b. a data size specifier holding a length of the memory storage segment.

8. A network node as claimed in claim 7, wherein each one of the data address specifier and the data size specifier has a byte level granularity.

9. A network node as claimed in claim 1, further comprising a state machine specifying values of the orphan counter to provide byte gathering and byte alignment of the conveyed PDU data.

10. A network node as claimed in claim 1, further comprising a state machine specifying values of the orphan counter to provide byte gathering, byte alignment, and byte re-ordering in conveying PDU data.

11. A peripheral interface conveying. PDU data via a channel, the peripheral interface comprising:
   a. a channel byte order specification register specifying a byte order of the PDU data conveyed via the data channel;
   b. a direct memory access controller responsive to a system byte order specification register and the channel byte order specification register in conveying PDU data; and c. an orphan counter for tracking data bytes conveyed between a central memory store and the peripheral interface, said orphan counter being implemented via a register having a largest expressible value chosen to roll-over on a selected data alignment boundary of a data stream conveyed via the peripheral interface, the direct memory access controller performing byte order conversion on the PDU data during the conveyance thereof to reduce processing overheads at the network node.

12. A peripheral interface as claimed in claim 11, further comprising a state machine specifying values of the orphan counter to provide byte gathering and byte alignment of the conveyed PDU data.

13. A peripheral interface as claimed in claim 11, further comprising a state machine specifying values of the orphan counter to provide byte gathering, byte alignment, and byte re-ordering in conveying PDU data.

* * * * *